Dec. 29, 1959   G. W. BEHNKE ET AL   2,918,926
WASHING AND DEGREASING APPARATUS
Filed Jan. 30, 1957   3 Sheets-Sheet 1
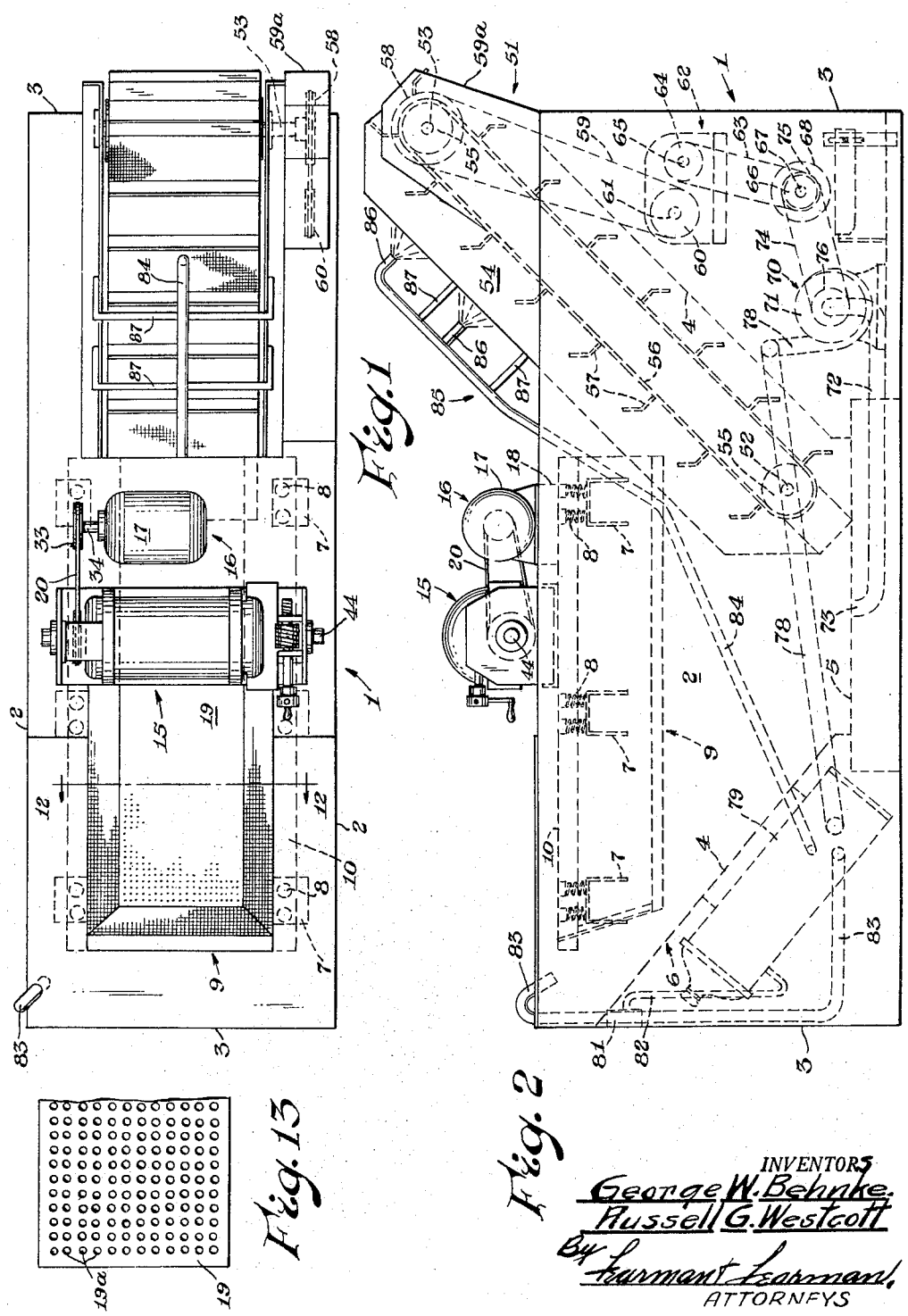
INVENTORS
*George W. Behnke*
*Russell G. Westcott*
By *Harman & Harman*
ATTORNEYS

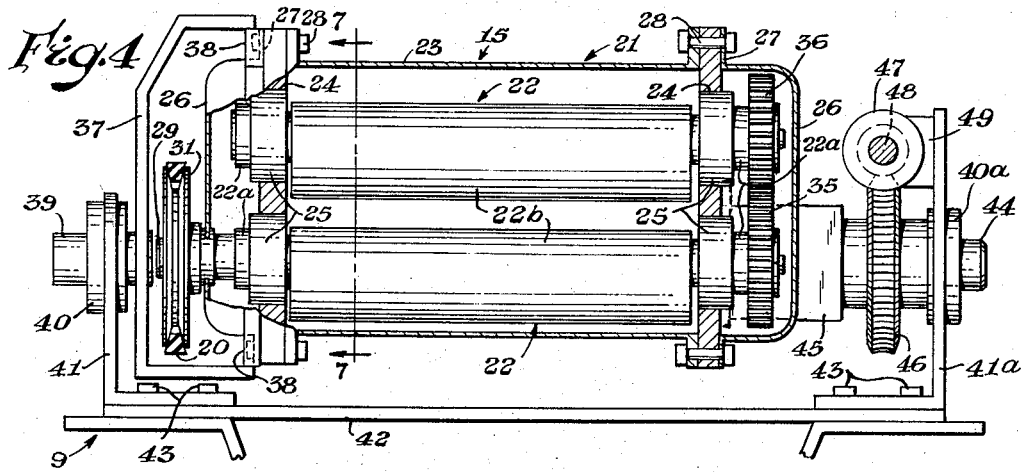
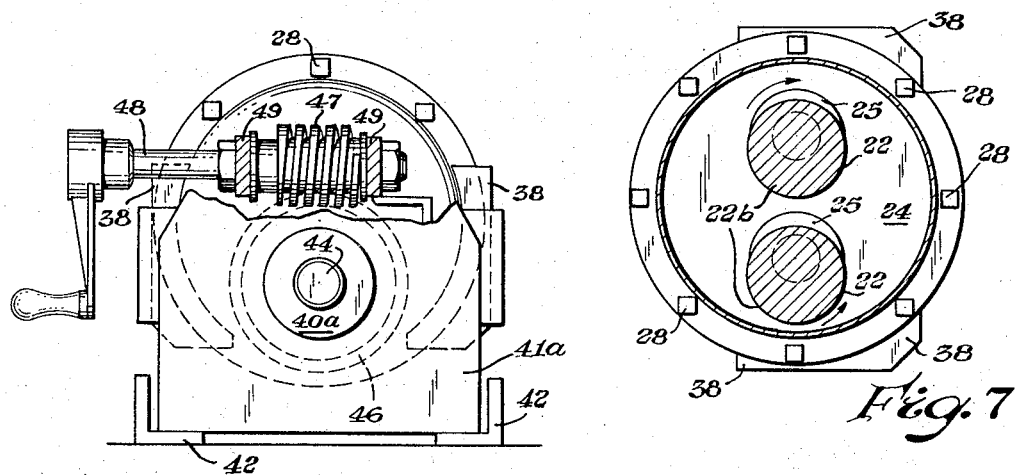
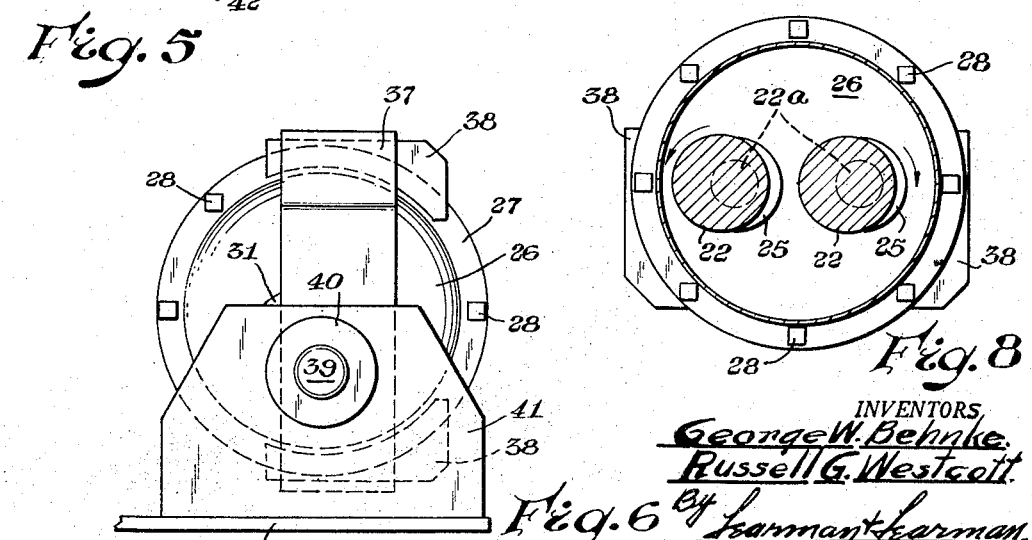

Dec. 29, 1959     G. W. BEHNKE ET AL     2,918,926
WASHING AND DEGREASING APPARATUS
Filed Jan. 30, 1957     3 Sheets-Sheet 3
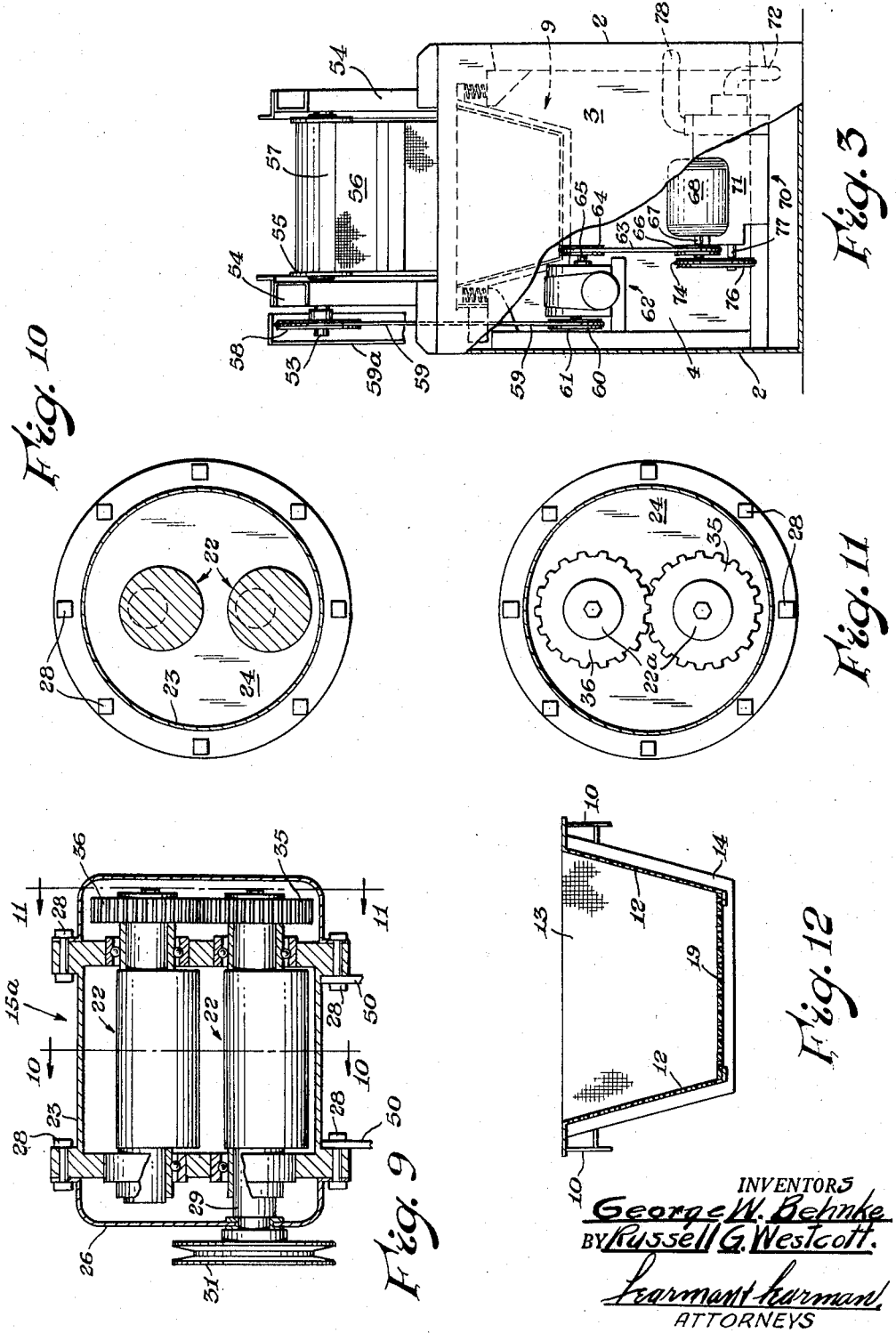

United States Patent Office 2,918,926
Patented Dec. 29, 1959

2,918,926

WASHING AND DEGREASING APPARATUS

George W. Behnke and Russell G. Westcott, Durand, Mich., assignors to Simplicity Engineering Company, Durand, Mich., a corporation of Michigan Application January 30, 1957, Serial No. 637,301

17 Claims. (Cl. 134—130)

This invention relates to apparatus for use in cleaning machined parts to remove chips, filings, grinding dust, oil, grease and the like quickly and economically with a minimum of handling, but with a thoroughness akin to hand washing of such parts.

Parts which have been subjected to a machining operation have dust, chips, oil, grease and the like clinging thereto which must be removed, usually by a washing process. When cleaning such parts it is preferable that the cleaning operation be substantially automatic so as not to require constant attendance of an operator. An object of the invention, therefore, is to provide cleaning apparatus capable of supporting parts in a suitable cleaning solution, causing the parts automatically to be moved through the solution, and automatically removed from the solution and the apparatus at the end of the cleaning cycle.

Another object of the invention is to provide parts cleaning apparatus capable of adjustment to regulate the duration of the washing cycle to the kind of parts to be cleaned and the rate of their delivery to the cleaning zone.

Another object of the invention is to provide parts cleaning apparatus having an oscillating parts conveyer and in which the oscillating path of the conveyer may be varied.

A further object of the invention is to provide improved vibrating apparatus adapted for use in connection with an oscillating parts washer construction.

A further object of the invention is to provide vibrating apparatus of the kind referred to and which includes improved mechanism for varying the path of vibration of the apparatus.

Other objects and advantages of the invention will be pointed out specifically or will become apparent from the following description when it is considered in conjunction with the appended claims and the accompanying drawings, in which:

Figure 1 is a top plan view of parts washing apparatus constructed in accordance with the principles of the invention;

Figure 2 is a side elevation of the apparatus shown in Figure 1;

Figure 3 is an end elevation of the apparatus as viewed from the right hand end of Figure 2;

Figure 4 is an enlarged fragmentary view, partly in elevation and partly in section, disclosing vibrating apparatus constructed in accordance with the invention;

Figure 5 is a side view, partly in elevation and partly in section, from the right hand end of Figure 4;

Figure 6 is an elevational view from the left hand end of Figure 4;

Figure 7 is a sectional view taken along the line 7—7 of Figure 4;

Figure 8 is a view similar to Figure 7, but showing the parts rotated through 90°;

Figure 9 is a sectional view similar to Figure 4, but showing a modified form of vibrating apparatus;

Figure 10 is a sectional view taken on the line 10—10 of Figure 9;

Figure 11 is a sectional view taken on the line 11—11 of Figure 9;

Figure 12 is a sectional view taken on the line 12—12 of Figure 1; and

Figure 13 is a detail plan view of a part of the apparatus.

Parts washing apparatus formed in accordance with the invention includes a main frame 1 composed of side and end members 2 and 3, respectively, suitably connected one to another to form a generally rectangular body having a central cavity therein. Adjacent to each end of the frame 1 there is provided a downwardly sloping member 4 secured at its side edges to the inner surfaces of the side members 2 and secured at their lower edges to a substantially horizontal member 5, the arrangement being such as to form a tank 6 in which a suitable cleaning solution may be contained. At longitudinally spaced intervals, the inner surfaces of the members 2 are provided with brackets 7 on each of which is mounted one or more springs 8. Yieldably mounted on the springs 8 for vibratory and oscillatory movements is a parts receiving basket 9 comprising a three-sided upper frame member 10 shaped to provide pockets 11 to receive the springs 8 and to which are secured side and rear wall members 12 and 13, respectively. The members 12 and 13 are formed of perforate material such as expanded metal, and these members are reinforced at suitable intervals by substantially U-shaped members 14.

Mounted on the basket 9 and spanning the latter from side to side is a vibrating device 15, about which more will be said later. Driving apparatus 16 comprising an electric motor 17 also is mounted on the basket 9 by means of a base plate 18 secured to the basket in any suitable manner. The arrangement of the parts thus far described is such that parts to be washed may be delivered to the basket by any acceptable means for deposit therein and immersed in fluid for washing. In this connection it is preferred that the bottom 19 of the basket be formed of a yieldable material such as polyvinylchloride or the like so as to minimize the likelihood of injuring delicate parts when they are placed in and moved through the length of the basket. The sides and bottom of the basket preferably are so constructed as to enable the bottom 19 to be replaced, and such a construction is shown in the drawings wherein the sides 12 include lower, inwardly directed flanges 12a which support the bottom 19. The bottom 19 should be perforated as at 19a to overcome its buoyancy and to assure free flow of washing fluid through the basket. During or after delivery of parts to the basket, the vibrating apparatus 15 may be operated by the motor 16, through a belt 20, to oscillate the basket in an orbital path so as to cause the parts in the basket to be moved through the cleaning liquid in the tank to the open end of the basket for discharge.

The movement of the parts through the washing liquid is of particular importance inasmuch as the efficiency of the washing operation depends in large measure on the relative motion between the parts to be washed and the fluid, and on the length of the washing cycle. When washing heavy parts having large surface areas, different motions and longer washing periods may be required than when washing relatively lighter parts having smaller surface areas. Thus, apparatus constructed in accordance with the invention and intended for use in washing different kinds of parts includes mechanism for controlling the washing rate and motion of the parts. This mechanism forms a part of the vibrating device 15 which, in the form of the invention disclosed in Figures 1-8, comprises a housing 21 providing journalling means for a pair of parallel, eccentric masses 22. The housing 21 preferably is composed of a central substantially cylindrical portion 23 having at each end journal blocks 24 carrying suitable bearings 25 in which the pair of masses 22 is journalled. Each of the masses comprises a shaft having its ends 22a concentric with the bearings 25, but being offset with respect to the central portion 22b of the shaft so that the center of mass of each shaft is eccentric to its axis of rotation. The housing also includes cover plates 26 at each end, the cover plates being substantially cup-shaped and having a peripheral flange 27 secured to the journal blocks 24 by means of bolts 28 or the like. One of the shafts 22 is provided with an extension 29 as shown.

The one shaft 22 carries at its outer end, a pulley 31 which is adapted to be driven by the belt 20 trained around a pulley 33 fixed on the armature shaft 34 of the driving motor 16. The other end of the driven shaft 22 has fixed thereto a driving gear 35 which meshes with a similar gear 36 fast on the other shaft 22 so that the drive imparted to one of the shafts is transmitted to the other, but in an opposite direction of rotation.

Means for mounting the vibrating device 15 includes a bracket 37 having an attaching strap 38 at each end for attachment by the bolts 28 to the housing 21. The bracket 37 has fixed thereto a stub shaft 39 which projects through and is journalled in a bearing 40 carried by a supporting part 41, the part 41 being secured to a base plate 42 adapted to be removably fixed to the basket 9 by means of bolts 43 or the like. A similar supporting part 41a is provided at the opposite end of the device 15 and in this part there is journalled by a bearing 40a one end of a shaft 44. The other end of the shaft 44 is enlarged as at 45 and is fixedly secured to the housing 27. Between the support part 43a and the cover plate 26 there is fixed on the shaft 44 a worm gear 46, the teeth of which mesh with a worm 47 mounted on a shaft 48 rotatably carried by lugs 49 fixed to the support part 41a. One end of the shaft 48 is provided with a crank 50 by means of which the worm may be driven to effect rotation of the worm gear 46 and consequent rotation of the shaft 44, whereby the vibrating device 15 will be rotated about the axes of the shafts 39 and 44.

Figures 7 and 8 illustrate the two useful extremes of rotation of the device 15. Figure 7 shows the device rotated to such position that the driving of the eccentric masses 22 in the directions indicated by the arrows will cause these masses alternately to oppose and complement one another, the points of complementary action being in a vertical plane. Figure 8 shows the device 15 rotated to a position when the points of complementary action of the eccentric masses are in a horizontal plane. When the device 15 is mounted on the parts receiving basket 9 and is rotated to a position in which the eccentric masses 22 are arranged as shown in Figure 7, the driving of the masses will cause the basket to be moved in an orbital path having its major axis lying in a substantially vertical plane coincident with the plane passing through the points where the masses complement each other. In this arrangement of the masses the parts in the basket will be agitated in the cleaning fluid in a path which is more vertical than horizontal. When the masses are arranged as shown in Figure 8, the path of agitation of the parts in the basket will be more horizontal than vertical. Between the two disclosed extreme positions of the masses 22, the parts in the basket will be agitated in paths having both horizontal and vertical components of selected varying degrees so as to enable parts in the basket to be driven towards the open or discharge end of the basket at a speed and with an action best calculated to clean the parts thoroughly and to keep pace with the delivery of parts to the apparatus.

The vibrating mechanism 15 is intended for use primarily in those instances where a variety of types of parts are presented successively for washing, thereby necessitating adjustment of the vibrating apparatus. In those instances where all of the parts to be cleaned are substantially uniform, it may not be necessary to provide for adjustment of the agitation of the parts. That is, the eccentric masses can be prearranged to accommodate the parts to be washed and thereafter no further adjustment is required. Apparatus constructed in accordance with the invention is capable of use in this manner and such an installation is shown in Figure 9. In this form of the invention, the masses 22, the bearing blocks 24, the cover plate 26 associated with the pulley 31, and the central portion 23 of the housing are the same as those described previously, the only change in the device itself being the substitution for the other cover plate 26 a cover 26a which does not include a shaft 44. Also, the supporting parts 41 and 41a and their associated parts may be eliminated. In this instance the bolts 28 may be used to mount the modified device 15a on angle or the like brackets 50 which may be secured to the basket 9 in a manner similar to the parts 41 and 41a. In Figures 9–11, the masses 22 are shown as being arranged to impart maximum vertical agitation to parts to be cleaned, but it will be understood that the device 15a will be so mounted as to locate the masses for the maximum efficiency of operation.

Referring now to Figures 1 and 2, operation of either of the vibrating devices 15 or 15a will oscillate the basket 9 in a manner to cause parts therein to be moved towards the right and discharged from the open end of the basket. A conveyor structure 51 is mounted in the tank 6 so that a portion thereof lies below the open end of the basket in a position to receive the discharged parts and convey them out of the tank for delivery to their next processing area. The conveyor structure comprises a pair of spaced shafts 52, 53 journalled in frame members 54 secured to the insides of the tank 6, the shafts each mounting a drum 55 or other suitable means around which an endless wire mesh belt 56 is trained. Fixed on the belt is a plurality of flights 57 which function to support parts on the belt as they are conveyed out of the tank. The shaft 53 at the upper end of the conveyor structure also has fixed adjacent to one end thereof a pulley or sprocket wheel 58 around which a drive transmission belt or chain 59 is trained. The parts 58 and 59 preferably are enclosed by a guard cover 59a. The drive transmission part 59 also is trained around a pulley or sprocket wheel 60 mounted on a shaft 61 forming part of a speed reducer 62 and suitably supported between the side frame members 2 outwardly of the tank. The shaft 61 and the wheel 60 are driven through gearing in the speed reducer 62 by a belt 63 trained around a pulley 64 on another shaft 65 of the speed reducer, and also trained around a pulley 66 on the driving shaft 67 of an electric motor 68.

As has been pointed out previously, the tank 6 will contain a cleaning solution of sufficient depth to insure that parts contained in the basket 9 will be immersed throughout the washing cycle. The cleaning solution will become dirty after a time, thereby decreasing the efficiency of the washer apparatus. To prevent a decrease in efficient cleansing of the parts, apparatus for cleaning the fluid is included. This apparatus is designated generally in Figure 2 by the reference character 70 and includes a centrifugual pump 71 mounted at the base of the frame and connected by a conduit 72 to an opening 73 in the bottom of the tank 6. The pump is driven by a belt 74 trained around a pulley 75 on the motor shaft 67 and around a pulley 76 on the pump shaft 77. A conduit 78 leads from the discharge side of the pump to a filter 79 mounted on the outside of the tank wall 4. The filter is of known construction and preferably utilizes a cleanable filter cartridge. To enable one to ascertain the condition of the cartridge, a gauge 81 of the pressure type is connected to the filter by a tube 82 in a known manner. A major portion of the fluid circulated through the filter is discharged through a hose 83 directly into the tank 6. A certain amount of cleaned fluid, however, is directed through a conduit 84 to a spray device 85 having a plurality of nozzles 86 supported by crossbars 87 spanning the conveyor supports 54 and arranged to spray fluid upon parts carried by the conveyor 51. As is well known, oil and grease particles float on other liquids. Hence the washed parts conveyed out of the tank are likely to have a film of oil deposited as they emerge from the fluid. The provision of the spray device enables this film to be washed off by fluid cleaned by the filter. The nozzles are so located that fluid sprayed therefrom will fall upon the walls of the tank and be returned thereto by gravity.

Summarizing the operation of the apparatus, parts to be cleaned will be conveyed or otherwise delivered to the basket 9 where they will be deposited at the left hand end of the latter, as viewed in Figures 1 and 2, and immersed in cleaning fluid contained in the tank. The driving motor 16 will impart rotation to the eccentric masses 22 which rotate in opposite directions so as alternately to oppose and complement one another at predetermined points in their rotation. This action will impart motion to the basket 9, the movement of the latter being in an orbital path having its major axis parallel to a plane passing through the points of complemental action of the eccentric masses. When the vibrating device is of the kind shown particularly in Figures 4–8, the path of movement of the basket may be varied, and while the apparatus is operating, by turning the worm 47 to effect a reaction between the journal housing 21 and the mounting means 41—41a and rotate the housing and the parts carried thereby so as angularly to change the plane of the points of action of the masses. If the housing is rotated so that this plane is more vertical, the parts in the basket will have greater vertical than horizontal movement, thereby prolonging the washing cycle. If the housing is rotated in the opposite direction, the opposite result will be obtained.

As the basket is vibrated, the parts therein will be moved towards the open end and be discharged upon the conveyor 51. These parts will be conveyed out of the tank and will be subjected to a spraying operation by the spray device 85, thereby assuring the delivery of thoroughly cleaned parts.

The disclosed embodiments are representative of presently preferred forms of the invention, but the disclosure is intended to be illustrative rather than definitive thereof. The invention is defined in the claims.

What is claimed is:

1. Parts washing apparatus comprising a main frame; a tank supported by said main frame and normally containing a washing liquid; a parts receiving basket having perforate bottom and side walls and an open end; means mounting said basket for oscillation and within said tank so that parts in said basket may be immersed in said liquid; oscillating means comprising a pair of eccentric masses; means journalling said masses for rotation about spaced axes so that at predetermined points in their rotation said masses alternately will oppose and complement one another; means mounting said journalling means on said basket for rotation; driving means connected to said masses for rotating them so as to impart to said basket oscillating movement in an orbital path having its major axis in a plane passing through the points of complemental action of said masses, said major axis being so located that oscillation of the basket moves parts in said basket towards the open end of the latter for discharge; means interconnecting said mounting means and said journalling means and being operable to rotate said journalling means about its axis so as to vary the rate at which parts are moved towards said open end of said basket; conveyor means supported in said tank by said main frame in a position to receive parts discharged from said basket and being operable to convey said parts to a point remote from said basket; a spray device having nozzles supported to direct liquid upon parts on said conveyor means; and means for withdrawing fluid from said tank for delivery to said nozzles, the arrangement of said nozzles being such that liquid discharged therefrom is returned to said tank by gravity.

2. Apparatus as set forth in claim 1 including liquid filtering means through which liquid delivered to said nozzles must pass.

3. Apparatus as set forth in claim 1 in which the bottom wall of said basket is formed of yieldable material.

4. Apparatus as set forth in claim 3 in which said material is polyvinylchloride.

5. Parts washing apparatus comprising a main frame; a tank supported by said main frame and normally containing a washing liquid; a parts receiving basket having perforate bottom and side walls and an open end; means mounting said basket for oscillation and within said tank so that parts in said basket may be immersed in said liquid; oscillating means comprising a pair of eccentric masses; means journalling said masses for rotation about spaced axes so that at predetermined points in their rotation said masses alternately will oppose and complement one another; means mounting said journalling means on said basket for rotation; driving means connected to said masses for rotating them so as to impart to said basket oscillating movement in an orbital path having its major axis in a plane passing through the points of complemental action of said masses, said major axis being so located that oscillation of said basket moves parts in said basket towards the open end of the latter for discharge; means interconnecting said mounting means and said journalling means and being operable to rotate said journalling means about its axis so as to vary the rate at which parts are moved towards said open end of said basket; and means positioned in said tank to receive parts discharged from said basket and convey them out of the tank.

6. Apparatus as set forth in claim 5 in which the bottom wall of said basket is formed of yieldable material.

7. Apparatus as set forth in claim 6 in which said material is polyvinylchloride.

8. Apparatus as set forth in claim 6 in which said bottom wall is removably supported by said end and side walls.

9. Vibrating apparatus comprising mounting means adapted for connection to a body to be vibrated; journalling means mounted on said mounting means for rotation; a pair of eccentric masses journalled in said journalling means for rotation about spaced, parallel axes, said masses being so arranged as alternately to oppose and complement one another at predetermined points in their rotation so as to vibrate a body connected to said mounting means in a plane passing through the points of complemental action; driving means for rotating said masses; and means reacting between said mounting means and said journalling means for angularly varying said points.

10. Apparatus as set forth in claim 9 in which said driving means includes a driving part connected to one of said masses and a driven part connected to the other of said masses and arranged to be driven by said driving part but in an opposite direction to the direction of rotation of the driving part.

11. Apparatus as set forth in claim 9 in which said reacting means comprises a rotatable part fast on said journalling means and a cooperating part on said mounting means operable to rotate said rotatable part.

12. Apparatus as set forth in claim 11 in which said rotatable part comprises a worm gear and in which said cooperating part comprises a worm in mesh with said worm gear.

13. Vibrating means comprising a housing structure; a mounting structure for said housing structure adapted for connection to a body to be vibrated; a pair of eccentric masses journalled in said housing structure for rotation about spaced, parallel axes and enclosed within the housing structure, said masses being so arranged as alternately to oppose and complement one another at predetermined points in their rotation so as to vibrate said housing structure in a plane passing through the points of complemental action; driving means connected to said masses for rotating the latter; and means interconnecting said housing structure and said mounting structure for rotating the housing structure relative to said mounting structure, whereby said points may be varied angularly.

14. Apparatus as set forth in claim 13 in which said interconnecting means comprises a driven part mounted fast on one of said structures and a driving part mounted on the other of said structures and operable to drive said driven part angularly.

15. Apparatus as set forth in claim 14 in which said driven part is mounted on said housing structure and said driving part is mounted on said mounting structure.

16. Apparatus as set forth in claim 15 wherein said driven part comprises a worm gear and said driving part comprises a worm.

17. Apparatus as set forth in claim 13 wherein said masses are rotated simultaneously in opposite directions by said driving means.

References Cited in the file of this patent

UNITED STATES PATENTS

| | | |
|---|---|---|
| 2,015,512 | Brogden | Sept. 24, 1935 |
| 2,179,868 | Stebler | Nov. 14, 1939 |
| 2,180,947 | Ball | Nov. 21, 1939 |
| 2,472,794 | Cothran | June 14, 1949 |
| 2,536,471 | Schunck | Jan. 2, 1951 |
| 2,601,411 | McLauchlan | June 24, 1952 |
| 2,618,577 | Bash | Nov. 18, 1952 |
| 2,714,257 | Reading | Aug. 2, 1955 |